UNITED STATES PATENT OFFICE.

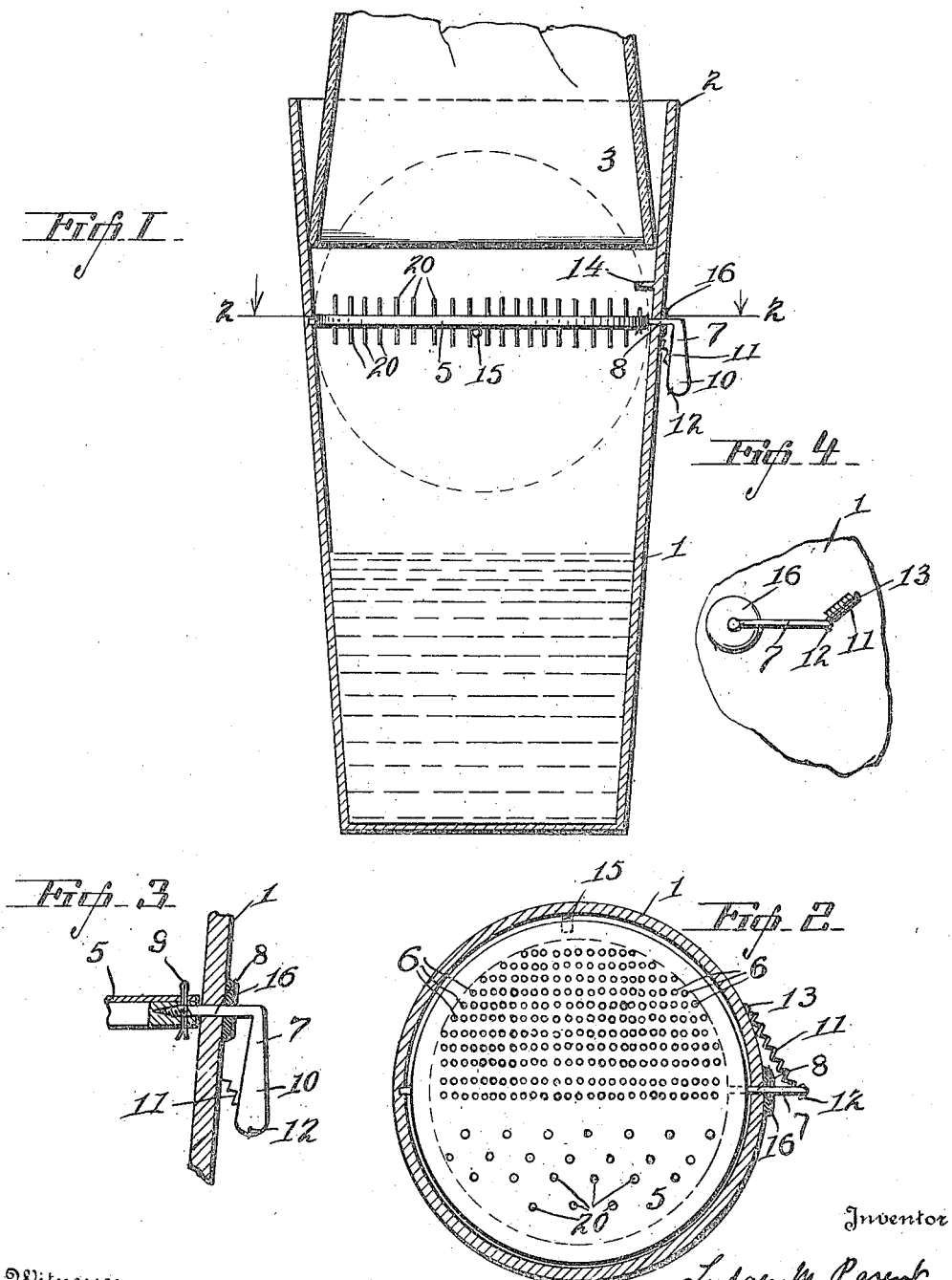

LUDGER M. PARENT, OF BOSTON, MASSACHUSETTS.

BEVERAGE-MIXER.

1,141,207.

Specification of Letters Patent.

Patented June 1, 1915.

Application filed January 16, 1914. Serial No. 812,497.

*To all whom it may concern:*

Be it known that I, LUDGER M. PARENT, a citizen of the United States, residing at Boston, in the county of Suffolk and State of Massachusetts, have invented certain new and useful Improvements in Beverage-Mixers, of which the following is a specification.

This invention relates to mixing devices or "shakers" which are actuated by shaking and is particularly designed for the mixing of various types of beverage.

A primary object of this invention is the provision of a shaker for use in soda fountains, bars or the like, which is comparatively simple in construction and will efficiently mix the beverage, embodying means for retaining any solid or coagulated particles therein when the contents are poured from the same.

The invention comprehends the provision of a container of tapering construction which has a strainer pivotally mounted therein and held in a non-straining position within the container during the shaking of the same or the mixing of the liquid, which strainer has a plurality of breakers or globule shredders secured thereto for more efficiently mixing the beverage and tearing apart any coagulated particles of the ingredients of the beverage.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, in which—

Figure 1 is a central sectional view through the improved soda mixer showing the strainer in a position immediately prior to pouring the beverage from the container, Fig. 2 is a cross sectional view on the line 2—2 of Fig. 1, Fig. 3 is a detail sectional view of the manner of mounting the strainer and also of the handle for actuating the same, and Fig. 4 is a plan view of Fig. 3.

Referring more particularly to the drawings, 1 designates a container of tapering construction, which has its upper flared end 2 open and is adapted for the reception of the mouth or open end of a glass 3, as is shown in Fig. 1 of the drawings, when it is desired to mix a beverage. In mixing a beverage, after the ingredients of the beverage have been placed within the container 1, a glass is connected thereto or has its mouth inserted in the upper open end of the container, as is shown in Fig. 1, and the two are violently shaken, for the mixing of the ingredients.

The container 1 has a diaphragm 5 rotatably mounted therein, a short distance inwardly from the upper open end 2 of the same, which diaphragm has substantially one-half thereof provided with small perforations 6, thereby forming a strainer for the egress of the liquid, and it is designed to prevent the passing of solid or coagulated particles out of the container into the glass after the ingredients have been thoroughly mixed. The strainer 5 has a handle 7 secured thereto in any suitable manner. In Fig. 3 of the drawings, the handle 7 is shown provided with a screw threaded shank 8, which shank is inserted through the side of a container 1 and is securely connected to the strainer 5 by means of the screw threaded end and a cotter pin 9. The grip portion 10 of the handle 7, has a coil spring 11 connected thereto as at 12. The coil spring 11 is in turn connected at 13 to the side of the container 1 and it normally holds the handle 7 in the position which is shown in Fig. 4 of the drawings, thereby holding the strainer 5 in a vertical or non-straining position within the container 1. The container 1 has lugs or pins 14 and 15 secured thereto and extending inwardly into the interior of the same. These pins limit the movement of the strainer, the pin 14 limiting the vertical movement, while the pin 15 limits the downward movement of the strainer, holding the same in a horizontal position transversely of the container as is shown in Fig. 1. A washer 16, which is constructed of rubber or any other suitable resilient material is mounted about the shank 8 of the handle 7 and engages the outer surface of the container 1, to provide a fluid tight connection between the handle and the container.

The strainer 5 has a plurality of breakers or globule shredders 20 extending laterally from the surface of the same, and formed upon the half thereof, which is not provided with perforations. These breakers 20 are provided for the purpose of breaking up or shredding the globules or solid particles of the ingredients which are used in the mixing of various types of beverages and extend transversely in the container 1, when the strainer 5 is held in a non-straining position.

The spring 11 holds the strainer 5 in a vertical position within the container or in a non-straining position, this causes the breakers 20 to extend transversely in the container so that during the shaking operation of the same, the eggs or other ingredients of the beverage being mixed, will pass across the breakers 20 and thus the solid or coagulated particles of the same will be torn apart or shredded, providing a smooth and even beverage. After the beverage has been shaken until it is thoroughly mixed, the handle 7 is forced downwardly, against the action of the spring 11, into a lateral position within the container, as is shown in Fig. 1, this provides a strainer for the contents of the container, and prevents any solid particles of the ingredients of the beverage from passing into the glass, when the beverage is poured from the container into the glass.

In practical fields certain minor features of construction, combination and arrangement of parts may necessitate alterations to which the patentee is entitled, provided such alterations are comprehended within the scope of what is claimed.

What is claimed is:

1. A beverage mixer comprising a container, rotatable means disposed within said container for breaking up and thinning thickened portions of the contents of the container, and means to limit the rotation of said first named means.

2. A beverage mixer comprising a container, a rotatable strainer mounted within said container, means carried by said strainer for breaking up and thinning thickened portions of the contents upon engagement of the contents thereagainst when motion is imparted to the mixer, and means disposed within said container for limiting the movement of said strainer.

3. A beverage mixer comprising a container having one end open, a rotatable strainer located within said container and local to the open end thereof, means for normally holding said strainer in a non-straining position with respect to said container, and means disposed within said container for limiting the movement of said strainer.

4. A beverage mixer, comprising a container having one end open, a rotatable strainer located within said container and local to the open end thereof, means for rotating said strainer from the exterior of said container, means disposed within said container for limiting the movement of said strainer, and means coacting with said rotating means for normally holding said strainer in a non-straining position with respect to said container.

5. A beverage mixer, comprising a container, a strainer mounted within said container to rotate on an axis transverse to the axis of said container and comprising a foraminous diaphragm having means associated therewith for breaking up and thinning the thickened portions of the contents upon engagement of the contents thereagainst when motion is imparted to said container and said strainer is disposed in a plane parallel to the axis of said container.

6. A beverage mixer, comprising a container, a strainer mounted within said container to rotate on an axis transverse to the axis of said container and comprising a foraminous diaphragm having means associated therewith for breaking up and thinning the thickened portions of the contents upon engagement of the contents thereagainst when motion is imparted to said container and said strainer is disposed in a plane parallel to the axis of said container, means for rotating said strainer from the exterior of said container, means disposed within said container for limiting the movement of said strainer, and means coacting with said rotating means for normally holding said strainer in a plane parallel with the axis of said container.

In testimony whereof I affix my signature in presence of two witnesses.

LUDGER M. PARENT.

Witnesses:
ARTURO DE FILIPPO,
W. HUBERT WOOD.